Patented June 7, 1932

1,861,513

UNITED STATES PATENT OFFICE

LORENZO D. TAYLOR, OF NIAGARA FALLS, NEW YORK, ASSIGNOR TO THE MATHIESON ALKALI WORKS, OF NEW YORK, N. Y., A CORPORATION OF VIRGINIA

BLEACHING OF OILS

No Drawing.   Application filed October 22, 1930. Serial No. 490,543.

This invention relates to improvements in the bleaching of vegetable and animal oils and fats such as cottonseed oil, corn oil, linseed oil and tallow.

I have discovered that vegetable and animal oils and fats such as those just mentioned can be bleached by direct treatment with dry calcium hypochlorite containing upwards of 50%, or better 60%, available chlorine with several important advantages.

The calcium hypochlorite products high in available chlorine, the production of which is described in an application filed August 16, 1928, Serial Number 300,148, by Robert B. MacMullin and Maurice C. Taylor, are particularly useful, for example, in carrying out my present invention. These calcium hypochlorite products are distinguished from conventional bleaching powder or chlorinated lime not only by their high content of available chlorine but also by their chemical constitution. To some extent, the advantages of the invention are secured by the use of calcium hypochlorite, having the chemical constitution characteristic of these products, as distinguished from bleaching powder or chlorinated lime even though containing less than 50% available chlorine.

According to my present invention, dry calcium hypochlorite high in available chlorine is mixed with the oil or fat at a relatively low temperature, 20–40° C. for example, and the mixture is then heated to a temperature upwards of about 65° C., 70°–90° C. for example. I have found it important to heat the mixture of the oil or fat and the calcium hypochlorite from a relatively low temperature to the final temperature rather than to heat the oil or fat to a temperature approximating the final temperature and add the calcium hypochlorite at such relatively high temperature. The mixture of the oil or fat and the calcium hypochlorite is held at or near the final temperature for a period sufficient to effect the desired bleaching. Economy of the calcium hypochlorite and the bleaching are promoted by subjecting the oil or fat to treatment with caustic soda, in aqueous solution for example, particularly when the oil or fat contains substantial amounts of free fatty acids, prior to treatment with the calcium hypochlorite. In the treatment of oils and fats substantially free from free fatty acids an amount of the calcium hypochlorite sufficient to provide about 0.5% available chlorine by weight on the oil or fat is usually sufficient. Following treatment with the calcium hypochlorite, the resulting sludge may be separated from the oil or fat in any convenient manner and the oil or fat then freed from any remaining traces of available chlorine, for example, by blowing with superheated steam. Or, the mixture of the oil or fat and the calcium hypochlorite may be blown with superheated steam and the resulting sludge thereafter separated to produce an oil or fat free from available chlorine.

Examples of the application of my invention to various oils and fats will further illustrate the invention:

Cottonseed oil

I. Crude cottonseed oil originally containing 1.38% of free fatty acids was treated with a 14° Bé. aqueous solution of caustic soda under the conditions described by the American Oil Chemists Association. A dry calcium hypochlorite produced as described in the above mentioned application containing upwards of 60% available chlorine was mixed into this preliminarily refined oil for about fifteen minutes at about 20° C. in amounts sufficient to provide about 0.5% available chlorine by weight on the oil. This mixture was then heated to a temperature of about 70° C. and held at that temperature for about 3–4 hours. The oil was then separated from the resulting sludge and, after being heated to a temperature of about 105°–115° C., was blown with superheated steam for 8–18 hours, until the oil was free from available chlorine (tested with potassium iodide, acetic acid and a starch solution).

II. Instead of blowing the oil with superheated steam after separation of sludge as in the foregoing example, an equivalent amount of the calcium hypochlorite was mixed into a preliminarily refined oil of the same character for about 15 minutes at about 20° C., the mixture was heated to a temperature of about 105° C., superheated steam was then blown through the mixture until the desired bleaching was effected and the sludge formed was thereafter separated from the refined and bleached oil.

The bleached and refined oils so obtained were of superior color and of superior color stability during exposure to light as compared to cottonseed oils refined in the usual manner. The sludge formed may be separated from the oil by filtration or by settling. The same crude cottonseed oil treated with the calcium hypochlorite prior to treatment with caustic soda usually requires from two to three times the amount of the calcium hypochlorite to produce a bleached oil of comparable color. Both the rate of chlorine consumption and the rate of improvement in color tend to change most rapidly during the early part of the high temperature period of treatment. Even though the available chlorine is not completely consumed, there seems to be a limit to the bleaching effect of a fixed proportion of the calcium hypochlorite with respect to a given oil even though the high temperature period of the treatment be prolonged; further bleaching in such cases can be effected by increasing the proportion of the calcium hypochlorite used.

Corn oil

III. Crude corn oil was treated with caustic soda under the conditions described by the American Oil Chemists' Society. A dry calcium hypochlorite produced as described in the above mentioned application containing upwards of 60% available chlorine was mixed into this preliminarily refined oil for about 15 minutes at about 20° C. in amounts sufficient to provide about 0.6% available chlorine by weight on the oil. This mixture was heated to a temperature of about 70° C. and maintained at that temperature for about 3 hours. The bleached and refined oil was then separated from the resulting sludge and freed from available chlorine as described in the first example.

Greater care to avoid overheating should be taken in the treatment of corn oil than in the treatment of cottonseed oil since corn oil appears to be more sensitive to excessive temperatures.

Linseed oil

IV. A dry calcium hypochlorite produced as described in the above mentioned application containing upwards of 60% available chlorine was mixed into a raw linseed oil for about 15 minutes at about 20° C. and the mixture was then heated to a temperature of about 70° C. and maintained at that temperature for about 3 hours. The resulting sludge was thereafter separated from the bleached and refined oil.

In addition to bleaching the oil, this treatment of linseed oil apparently tends to accelerate drying of films produced from the treated oil.

Tallow

V. A dry calcium hypochlorite produced as described in the above mentioned application containing upwards of about 60% available chlorine was mixed into melted unrefined tallow in amounts sufficient to provide about 1.0% available chlorine by weight on the tallow. The mixture was then heated to a temperature of about 70° C. and maintained at that temperature for about 5 hours. The resulting sludge was then separated from the tallow, the tallow heated to a temperature of about 105°–115° C. and blown with superheated steam for about 4 hours, until free from available chlorine.

VI. Unrefined tallow of the same character was subjected to preliminary refining with about one-tenth ($\frac{1}{10}$) volume of an 18° Bé. aqueous solution of caustic soda for about 10 minutes at about 85° C., and was then subjected to the same bleaching treatment described in the foregoing example except that the amount of the calcium hypochlorite was reduced to about one-half of that used in the foregoing example. A bleached and refined tallow of comparable color was obtained.

In some cases I have been able to obtain oils of comparable color by treatment with conventional bleaching powder, in the same general manner, but the amount of available chlorine required usually exceeds by 10–15 fold the amount of available chlorine required when calcium hypochlorite high in available chlorine is used in accordance with my invention. The amount of sludge formed when bleaching powder is used is also much larger and the difficulties of sludge separation are much increased. Calcium hypochlorite high in available chlorine is distinguished from bleaching powder in that the calcium hypochlorite evolves oxygen rather than chlorine, thus operating as a dry oxidizing agent. This difference seems to explain the advantages of calcium hypochlorite as compared to conventional bleaching powder for the purposes of the invention. However, my invention is not predicated upon this or any other hypothesis but upon the results secured by operations of which the foregoing examples are illustrative.

I claim:

1. In the bleaching of vegetable and animal oils and fats of the class comprising cottonseed oil, corn oil, linseed oil and tallow, the improvement which comprises mixing a dry calcium hypochlorite containing upwards of 50% available chlorine with the oil or fat and heating the mixture to a temperature upwards of about 65° C.

2. In the bleaching of vegetable and animal oils and fats of the class comprising cottonseed oil, corn oil, linseed oil and tallow, the improvement which comprises treating the oil or fat with caustic soda and thereafter mixing a dry calcium hypochlorite containing upwards of 50% available chlorine with the oil or fat and heating the mixture to a temperature upwards of about 65° C.

3. In the bleaching of vegetable and animal oils and fats of the class comprising cottonseed oil, corn oil, linseed oil and tallow, the improvement which comprises mixing a dry calcium hypochlorite containing upwards of 50% available chlorine with the oil or fat and heating the mixture to a temperature upwards of about 65° C., separating resulting sludge from the oil or fat and thereafter blowing the oil or fat with superheated steam until free from available chlorine.

4. In the bleaching of vegetable and animal oils and fats of the class comprising cottonseed oil, corn oil, linseed oil and tallow, the improvement which comprises mixing a dry calcium hypochlorite containing upwards of 50% available chlorine with the oil or fat, blowing the mixture with superheated steam and thereafter separating the resulting sludge.

5. In the refining of linseed oil, the improvement which comprises subjecting the oil to oxidizing treatment with a dry calcium hypochlorite containing upwards of 50% available chlorine.

6. In the bleaching of vegetable and animal oils and fats of the class comprising cottonseed oil, corn oil, linseed oil and tallow, the improvement which comprises mixing a dry calcium hypochlorite containing upwards of 60% available chlorine with the oil or fat and heating the mixture to a temperature upwards of about 65° C.

7. In the bleaching of vegetable and animal oils and fats of the class comprising cottonseed oil, corn oil, linseed oil and tallow, the improvement which comprises mixing a dry calcium hypochlorite evolving oxygen rather than chlorine during the operation with the oil or/fat and heating the mixture to a temperature upwards of about 65° C.

In testimony whereof I affix my signature.

LORENZO D. TAYLOR.